(12) United States Patent
Lau (10) Patent No.: US 8,495,226 B2
(45) Date of Patent: Jul. 23, 2013

(54) DATA PATH SELECTION METHOD FOR COMMUNICATION SESSION

(75) Inventor: Priscilla Lau, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 74 days.

(21) Appl. No.: 13/182,991

(22) Filed: Jul. 14, 2011

(65) Prior Publication Data

US 2013/0019021 A1 Jan. 17, 2013

(51) Int. Cl.
*G06F 13/00* (2006.01)

(52) U.S. Cl.
USPC ............................ 709/228; 709/220; 709/229

(58) Field of Classification Search
USPC ........................... 709/220, 221, 227, 228, 229
See application file for complete search history.

(56) References Cited

U.S. PATENT DOCUMENTS

| 6,804,224 | B1 * | 10/2004 | Schuster et al. | 370/352 |
| 6,973,313 | B1 * | 12/2005 | Sebastian | 455/445 |
| 8,031,616 | B2 * | 10/2011 | Pelletier et al. | 370/241 |
| 8,250,211 | B2 * | 8/2012 | Swildens et al. | 709/225 |

* cited by examiner

*Primary Examiner* — Viet Vu (57) ABSTRACT

A network controller may receive a communication session request from a user device via a network gateway. The communication session request may include a request to establish a communication session between two or more devices. The network controller may also determine that a communication session corresponding to the communication session request requires a network boarder controller, access a data structure that associates network gateways with network border controllers according to distance, and use the data structure to identify a network border controller that is located nearest to the network gateway. The network controller may establish a communication session comprising a data transport path between the network gateway and the network border controller, of a plurality of network border controllers, nearest to the network gateway.

23 Claims, 8 Drawing Sheets

DATA PATH SELECTION METHOD FOR COMMUNICATION SESSION

BACKGROUND

Internet Protocol (IP) Multimedia Subsystem (IMS) and Long Term Evolution (LTE) network technologies enable a user device to communicate with another user device or network device/application (e.g., a voice mail system) for voice or data services by establishing a communication session, between two ends, that consists of a signaling path and a media path. Many of these communication sessions involve the use of a session border controller (SBC), supporting inter-carrier or inter-technology inter-working and topology hiding functions, and/or a media resource function (MRF), providing a transcoding (e.g., encoding and decoding) function. In a large scale network implementation, there are usually many instances of the same network elements (e.g., packet data network (PDN) gateway (PGW), SBC, MRF, etc.) deployed in different locations. Today, there is no existing solution for a call session control function (CSCF) to select a SBC or a MRF so that the media path, carrying the real-time transport protocol (RTP) data packets between the two ends of a communication session, is as short as possible. As a result, user data are being hauled over a long distance causing degraded quality of service.

DETAILED DESCRIPTION OF PREFERRED EMBODIMENTS

The following detailed description refers to the accompanying drawings. The same labels and/or reference numbers in different drawings may identify the same or similar elements.

In one or more implementations, described herein, devices may be used to establish communication sessions with efficient data transport paths. For example, a communication session controller may receive a request for a communication session from a user device via network gateway. The request may be directed to another user device or a network device/application in the same network or in another network or across different technologies. The communication session controller may identify a network border controller and (if needed) a media resource processor that are located closest to the network gateway. The communication session controller may establish the requested communication session with a data transport path that includes the network gateway, the network border controller, and (if needed) the media resource processor. The data transport path may include a media path and/or a bearer path.

Figure 1:
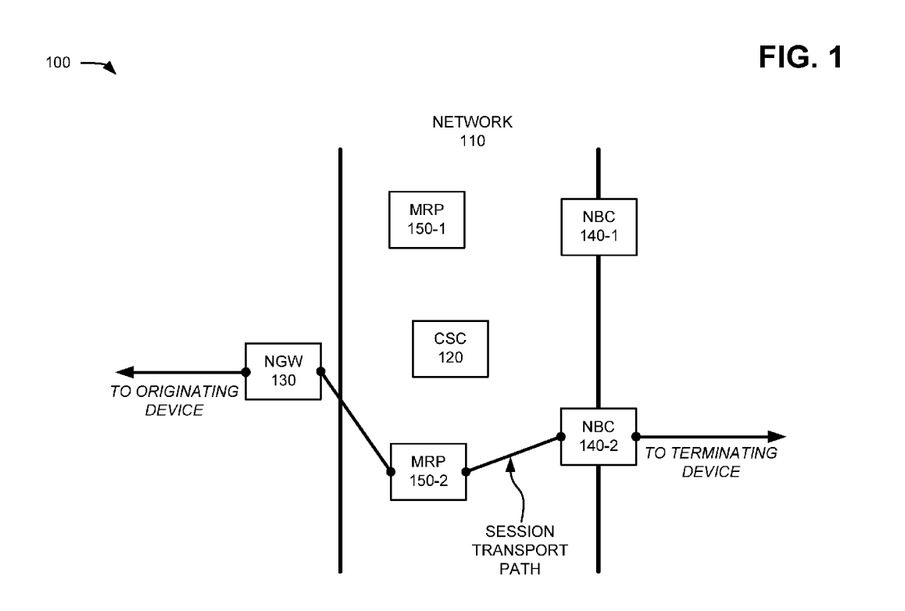
FIG. 1 is a diagram of an example overview of an implementation described herein.

FIG. 1 is a diagram of an example overview 100 of an implementation described herein. As depicted, overview 100 may include network 110, communication session controller (CSC) 120, network gateway (NGW) 130, network border controllers (NBCs) 140-1 and 140-2 (hereinafter referred to collectively as "border controllers 140," and individually as "border controller 140"), and media resource processors (MRPs) 150-1 and 150-2 (hereinafter referred to collectively as "media resource processors 150," and individually as "media resource processor 150"). In some implementations, one or more of the networks or devices of FIG. 1 may correspond to networks or devices discussed elsewhere in this specification.

Network 110 may be any type of network or combination of networks. For example, network 110 may include a local area network (LAN) (e.g., an Ethernet network), a wireless LAN (WLAN) (e.g., an IEEE 802.11x network), a wide area network (WAN) (e.g., the Internet), or a wireless WAN (WWAN) (e.g., a Long-Term Evolution (LTE) network, a High-Speed Packet Access (HSPA) network, a Worldwide Interoperability for Microwave Access (WiMax) network, etc.). Additionally, or alternatively, network 110 may include a fiber optic network (e.g., a fiber-optic communications (FiOS) network), a metropolitan area network (MAN), an ad hoc network, a telephone network (e.g., a Public Switched Telephone Network (PSTN)), a cellular network, a voice over Internet Protocol (Voice over IP, VoIP) network, or an IP multimedia subsystem (IMS) network.

Communication session controller 120 may include a variety of computing or communication devices. For example, communication session controller 120 may include a computer, a server, a cluster of servers, or another type of device capable of operating in a network environment. In some implementations, communication session controller 120 may include a session initiation protocol (SIP) server operating in accordance with one or more call session control functions (CSCF). For example, in some implementations, communication session controller 120 may be implemented as a Serving-CSCF (S-CSCF) server. In other implementations, communicate session controller 120 may include a S-CSCF and/or Proxy-CSCF (P-CSCF).

Similarly, network gateway 130 may include one or more of a variety of computing or communication devices. For example, network gateway 130 may include a router, a switch, a hub, or another device capable of providing connectivity and data transfer services between networks. In some implementations, network gateway 130 may include a packet data network gateway (PDN gateway, PGW) of an access network.

Network border controller 140 may also include one or more of a variety of computing or communication devices. For example, network border controller 140 may include a computer, a server, a cluster of servers, or another type of device capable of operating in a network environment. Network border controller 140 may also, or alternatively, include a router, a switch, a hub, or another device capable of providing connectivity and/or data transfer services between networks. In some implementations, network border controller 140-1 and 140-2 may include a session border controller (SBC) capable of providing a network-to-network interface for interactive media communications, such as VoIP calls and other types of communications.

Similarly, media resource processor 150 may include one or more of a variety of computing or communication devices. For example, media resource processor 150 may include a computer, a server, a cluster of servers, or another type of network device. In some implementations, media resource processor 150 may be capable of providing media-related services (e.g., media manipulation, voice stream mixing, voice stream encoding, voice stream decoding, transcoding between two different voice codecs or data formats, etc.).

As mentioned above, communication session controller 120 may receive a communication session request from an originating user device 250 via network gateway 130. In some implementations, the communication session request may be directed to a device (e.g., a user device) corresponding to a network outside of network 110 (e.g., an external network). Communication session controller 120 may respond by identifying which network border controller 140 (e.g., network border controller 140-2) is closest to network gateway 130. If encoding or decoding services are required, communication session controller 120 may identify which media resource processor 150 (e.g., media resource processor 150-2) is closest to network gateway 130. Communication session controller 120 may also, or alternatively, establish the requested communication session with a data transport path that includes the identified network border controller 140-2 and the identified media resource processor 150-2.

As described herein, the closeness of one device to another device may vary depending on the implementation. In some implementations, closeness may relate to a number of network devices between two devices (e.g., the number of "hops" required to travel from one network device to another network device). In other implementations, closeness may be based on an average time required to travel from one network device to another network device. In yet other implementations, closeness may be based on a geographic distance between two devices. In certain implementations, closeness may be a function involving multiple factors, including one or more of the factors discussed previously. In certain implementations, establishing a communication session using network devices in close proximity to one another may increase data transmission efficiency in the network and reduce transmission delay.

Figure 2:
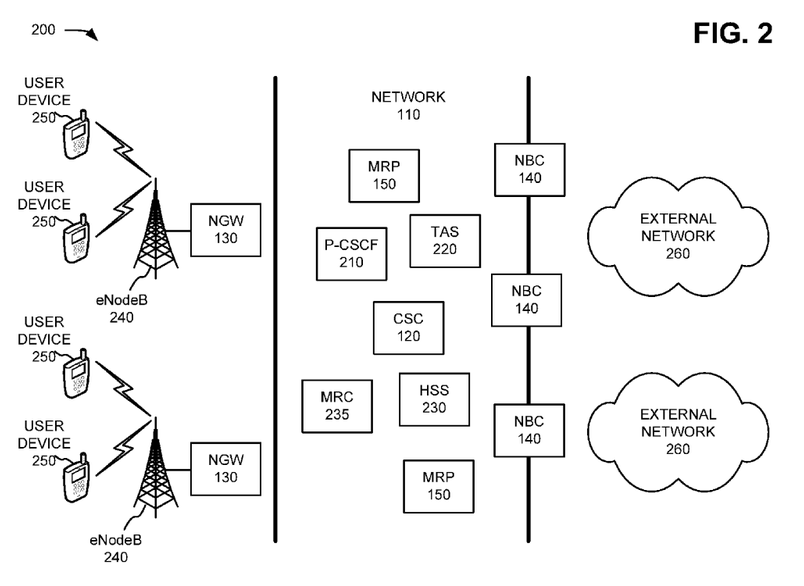
FIG. 2 is a diagram of an example environment in which systems and/or methods, described herein, may be implemented.

FIG. 2 is a diagram that illustrates an example environment 200 in which systems and/or methods, described herein, may be implemented. As depicted, environment 200 may include network 110 (including communication session controller 120, network border controllers 140, media resource processors 150, proxy call session controller function (P-CSCF) server 210, telephony application server (TAS) 220, home subscriber server (HSS) 230, and media resource controller (MRC) 235), network gateways 130, enhanced nodeB's (eNodeBs) 240, user devices 250, and external networks 260. While FIG. 2 shows a particular number and arrangement of systems, networks, or devices, in alternative implementations, environment 200 may include additional systems, networks or devices, fewer systems, networks or devices, different systems, networks or devices, or differently arranged systems, networks or devices than those depicted.

Network 110, communication session controller 120, network gateways 130, network border controllers 140, and media resource processors 150 are described above with reference to FIG. 1. P-CSCF server 210 may include one or more of a variety of computing or communication devices. For example, P-CSCF server 210 may include a computer, a server, a cluster of servers, or another type of device capable of operating in a network environment. In some implementations, P-CSCF server 210 may include a SIP server that is an entry point into network 110 for some devices (e.g., user devices 250). P-CSCF server 210 may be involved in various network processes including subscriber registration and session initiation. In some implementations, P-CSCF 210 and CSC 120 may be implemented on the same network device.

TAS 220 may include one or more of a variety of computing or communication devices. For example, TAS 220 may include a computer, a server, a cluster of servers, or another type of device capable of operating in a network environment. In some implementations, TAS 220 may include a back-to-back SIP user agent capable of maintaining call states. Additionally, or alternatively, TAS 220 may provide various telephony services that may not be directly related to routing network messages. For example, TAS 220 may provide telephony services, such as call waiting, call forwarding, call conferencing, or other types of services relating to communication sessions. In some implementations, TAS 220 may not be implemented.

Similarly, HSS 230 may include one or more of a variety of computing or communication devices, such as a computer, a server, a cluster of servers, or another type of network device. In some implementations, HSS 230 may include a network device operating in a control plane of network 110. HSS 230 may function as a repository of network authorizations, service profiles, or preferences relating to network 110. For example, HSS 230 may include identifiers of user devices 250, network gateways 130, network border controllers 140, media resource processors 150, or other devices shown in FIG. 2. HSS 230 may store an identification (e.g., a IP address or fully qualified domain name (FQDN)) of the NGW 130 that is serving user device 250. The assignment of the NGW 130 to user device 250 may be via static provisioning or dynamic assignment when user device 250 performs network attachment and authentication procedures with NGW 130.

MRC 235 may include one or more of a variety of computing or communication devices. For example, MRC 235 may include a computer, a server, a cluster of servers, or another type of device capable of operating in a network environment. In some implementations, MRC 235 may be implemented as a signaling plane node capable of receiving information from communication session controller 120 and controlling media resource processor 150. In some implementations, MRC 235 and media resource processor 150 may be implemented by the same network device. In some implementations, MRC 235 may be implemented on the same device as CSC 120. In other implementations, MRC 235 and MRP 150 may be implemented in the same device; and, in such implementations, selecting MRP 150 by CSC 120 may include selecting both MRC 235 and a MRF.

eNodeBs 240 may each include a base station that covers a geographic area. Each eNodeB 240 may include one or more devices that receive information from network gateways 130 and/or devices that transmit information to user devices 250 via an air interface. Each eNodeB 240 may also include one or more devices that receive information from user devices 250 via an air interface and/or that transmit the information to network gateways 130. In some implementations, there may be a serving gateway (SGW) (not shown in FIG. 2) providing the connectivity between eNodeB 240 and NGW 130. The selection of the SGW or NGW 130, by eNodeB 240, may be directed by a mobility management entity (MME) (not shown in FIG. 2).

User devices 250 may include one or more of a variety of devices capable of network communications. For example, user devices 250 may include telephones, smart phones, laptop computers, tablet computers, desktop computers, personal digital assistants (PDAs), and other types of electronic devices. As depicted, user devices 250 may be capable of communicating wirelessly with eNodeBs 240.

External networks 260 may each be any type of network or combination of networks. For example, external networks 260 may each include a local area network (LAN) (e.g., an Ethernet network), a wireless LAN (WLAN) (e.g., an IEEE 802.11x network), a wide area network (WAN) (e.g., the Internet), or a wireless WAN (WWAN) (e.g., a Long-Term Evolution (LTE) network, a High-Speed Packet Access (HSPA) network, a Worldwide Interoperability for Microwave Access (WiMax) network, etc.). Additionally, or alternatively, network 110 may include an optical fiber (or fiber optic)-based network, a metropolitan area network (MAN), an ad hoc network, a telephone network (e.g., a Public Switched Telephone Network (PSTN)), a cellular network, a voice over Internet Protocol (Voice over IP, VoIP) network, or an IP multimedia subsystem (IMS) network).

Figure 3:
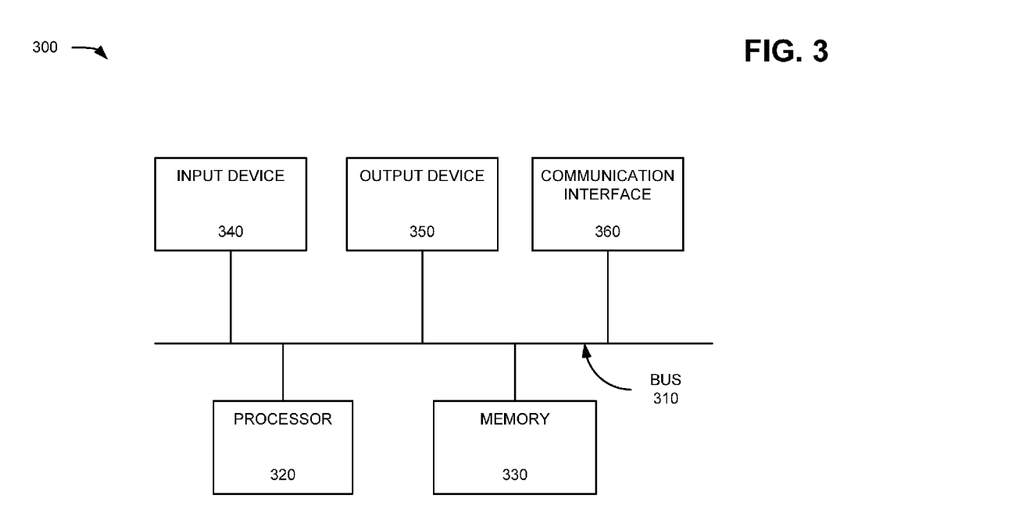
FIG. 3 is a diagram of example components of a device capable of operating in the environment of FIG. 2.

FIG. 3 is a diagram of example components of a device 300 capable of operating in the environment of FIG. 2. For example, device 300 may correspond to communication session controller 120, network gateway 130, network border controller 140, media resource processor 150, P-CSCF server 210, TAS 220, HSS 230, MRC 235, eNodeB 240, or user device 250. As depicted in FIG. 3, device 300 may include bus 310, processor 320, memory 330, input device 340, output device 350, and communication interface 360. However, in other implementations, device 300 may include fewer components, additional components, different components, or differently arranged components than those illustrated in FIG. 3.

Bus 310 may include one or more paths that permit communication among the components of device 300. Processor 320 may include one or more processors, microprocessors, data processors, co-processors, network processors, application-specific integrated circuits (ASICs), controllers, programmable logic devices (PLDs), chipsets, field-programmable gate arrays (FPGAs), or other types of components that may interpret or execute instructions or data. Processor 320 may control the overall operation, or a portion thereof, of device 300, based on, for example, an operating system and/or various applications. Processor 320 may access instructions from memory 330, from other components of device 300, or from a source external to device 300 (e.g., a network or another device).

Memory 330 may include memory and/or secondary storage. For example, memory 330 may include random access memory (RAM), dynamic RAM (DRAM), read-only memory (ROM), programmable ROM (PROM), flash memory, or some other type of memory. Memory 330 may include a hard disk (e.g., a magnetic disk, an optical disk, a magneto-optic disk, a solid state disk, etc.) or some other type of computer-readable medium, along with a corresponding drive. A computer-readable medium may be defined as a non-transitory memory device. A memory device may include space within a single physical memory device or spread across multiple physical memory devices.

Input device 340 may include one or more components that permit a user to input information into device 300. For example, input device 340 may include a keypad, a button, a switch, a knob, fingerprint recognition logic, retinal scan logic, a camera, voice recognition logic, a touchpad, an input port, a microphone, a display, or some other type of input component. Output device 350 may include one or more components that permit device 300 to output information to a user. For example, output device 350 may include a display, light-emitting diodes (LEDs), an output port, a speaker, or some other type of output component.

Communication interface 360 may include one or more components that permit device 300 to communicate with other devices or networks. For example, communication interface 360 may include some type of wireless or wired interface. Communication interface 330 may also include an antenna (or a set of antennas) that permit wireless communication, such as the transmission and reception of radio frequency (RF) signals.

Figure 4:
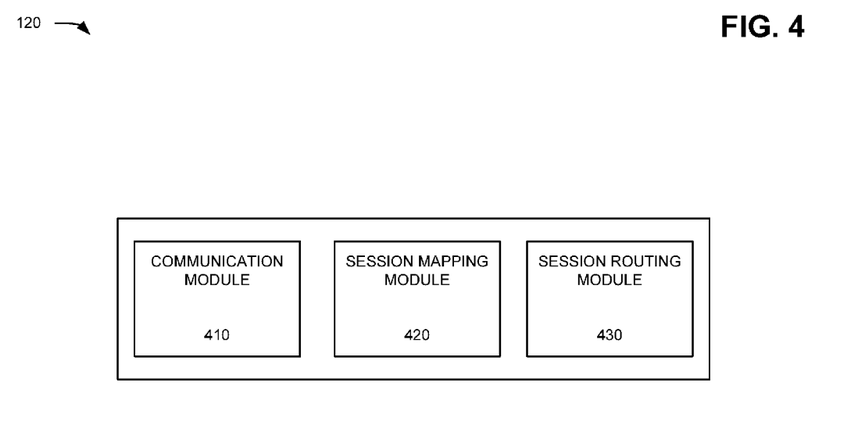
FIG. 4 is a diagram of example functional components of a communication session controller (CSC) of FIG. 2.

As described herein, device 300 may perform certain operations in response to processor 320 executing software instructions contained in a computer-readable medium, such as memory 330. The software instructions may be read into memory 330 from another computer-readable medium or from another device via communication interface 360. The software instructions contained in memory 330 may cause processor 320 to perform one or more processes described herein. Alternatively, hardwired circuitry may be used in place of, or in combination with, software instructions to implement processes described herein. Thus, implementations described herein are not limited to any specific combination of hardware circuitry and software FIG. 4 is a diagram of example functional components of communication session controller 120. As depicted, communication session controller 120 may include communication module 410, session mapping module 420, and session routing module 430. Depending on the implementation, one or more of the modules 410-430 may be implemented as a combination of hardware and software based on the components illustrated and described with respect to FIG. 3. Alternatively, modules 410-430 may each be implemented as hardware based on the components illustrated and described with respect to FIG. 3. While FIG. 4 shows a particular number and arrangement of modules, in alternative implementations, communication session controller 120 may include additional modules, fewer modules, different modules, or differently arranged modules than those depicted.

Communication module 410 may provide functionality with respect to sending and receiving data and other information. For example, communication module 410 may enable communication session controller 120 to communicate with network gateway 130, network border controller 140, media resource processor 150, P-CSCF server 210, TAS 220, HSS 230, or other network devices. Additionally, or alternatively, communication module 410 may receive a communication session request from network gateway 130. Communication module 410 may also, or alternatively, receive an identifier of network gateway 130 in response to user device 250 registering with HSS 230.

Session mapping module 420 may provide functionality with respect to charting a route or path for a communication session. For example, session mapping module 420 may enable communication session controller 120 to identify network gateway 130. Identifying network gateway 130 may include determining an identifier (ID) associated with network gateway 130 (also referred to as a network gateway ID). Examples of a network gateway ID may include an IP address of network gateway 130 or a FQDN of network gateway 130. An FQDN may include a domain name that specifies an exact location in a hierarchal Domain Name System (DNS). A FQDN may specify multiple domain levels, including a top-level domain and a root domain. In some implementations, session mapping module 420, or a different module of the CSC 120, may maintain the state of a communication session so that session mapping module 420 may release the corresponding media at the end of the communication session.

Session mapping module 420 may determine whether a communication session request is directed to external network 260. Session mapping module 420 may also, or alternatively, identify which network border controller 140 is nearest to network gateway 130. In some implementations, session mapping module 420 may do so by obtaining an ID of network gateway 130, accessing a locally or remotely stored data structure (e.g., a table, a map or a database) that associates network gateways 130 with network border controllers 140 according to distance or other criteria, and using the ID of network gateway 130 to identify which network border controller 140 is nearest to network gateway 130 according to the data structure.

In some implementations, session mapping module 420 may obtain the ID of network gateway 130 by accessing memory 330 or another data storage device. As mentioned above, communication module 410 may receive IDs of network gateways 130 when user devices 250 connect to an access network of network gateway 130 and register with HSS 230. In such implementations, the reception of network gateway IDs may be sent to CSC 120 via an existing network interface, such as a Cx interface between communication session controller 120 and HSS 230. A new diameter attribute value pair (AVP) may be added to a Cx message from HSS 230 to CSC 120 to carry an ID of network gateway 130 serving user device 250.

In other implementations, session mapping module 420 may determine the ID of network gateway 130 based on an IP address, such as an IP version 6 (IPv6) address, of an originator of the communication session request (e.g., user device 250). In such implementations, the ID (e.g., an IP address) may be assigned by network gateway 130 to user device 250 from a pool of IDs (e.g., IP addresses) allocated to network gateway 130. Session mapping module 420 may determine the ID of network gateway 130 in a variety of ways, which may include accessing one or more IP routing tables that include network addressing information and/or analyzing the hierarchical routing domains represented by an IP address of the originator of the communication session.

Session mapping module 420 may also, or alternatively, determine that the communication session will require encoding and/or decoding services (e.g., a vocoder, a voice encoder, an Xcoder, a Vcoder, a transcoder, etc.). In some implementations, session mapping module 420 may do so by, for example, identifying a voice encoder used by an originating device, identifying a voice encoder used by a terminating device, and determining whether the voice encoder of the originating device is compatible with the voice encoder of the terminating user device. In scenarios where encoding and/or decoding services are required, session mapping module 420 may identify which media resource processor 150 is nearest to network gateway 130 so that the nearest media resource processor 150 may be included in a data transport path of the communication session.

In some implementations, session mapping module 420 may identify which media resource processor 150 is nearest to network gateway 130 by performing operations similar to those discussed above with respect to identifying which media resource processor 150 is nearest to network gateway 130. For example, session mapping module 420 may obtain an ID of network gateway 130, access a data structure that associates network gateways 130 with media resource processors 150 according to distance or other criteria, and use the network gateway ID and the data structure to identify which media resource processor 150 is nearest to network gateway 130. In some implementations, If MRC 235 is external to CSC 120, CSC 120 may send the ID of the identified MRP 150 to MRC 235 in a signaling message (e.g., a SIP INVITE message). Once the ID of the closest MRP 150 has been received, MRC 235 may ensure the identified MRP 150 will be inserted into the data transport path.

However, session mapping module 420 may also, or alternatively, identify which media resource processor 150 is nearest to network gateway 130 indirectly by sending the network gateway ID of network gateway 130 to MRC 235, and MRC 235 may identify which media resource processor 150 is nearest to network gateway 130. MRC 235 may do so by, for example, accessing a locally stored data structure that associates network gateways 130 with media resource processors 150 according to distance. In such implementations, session mapping module 420 may communicate the network gateway ID to MRC 235 using a signaling message, such as an SIP INVITE message and/or a private protocol extension. Once, MRC 235 has determined the closest MRP 150 to network gateway 130, MRC 235 may ensure the identified media resource processor 150 will be included in the data transport path of the communication session.

Session routing module 430 may provide functionality with respect to establishing, maintaining, and terminating communication sessions. For example, session routing module 430 may enable communication session controller 120 to establish a data transport path for a communication session. In some implementations, the data transport path may include network gateway 130 and whichever network border controller 140 and/or media resource processor 150 is/are nearest to network gateway 130. In certain implementations, the communication session may be established between a user device 250 connected to an access network of network gateway 130 and a user device 250 of external network 260. Additionally, or alternatively, the data transport path may include one or more of a variety of communication or data transport protocols, such as real-time transport protocol (RTP).

Figure 5:
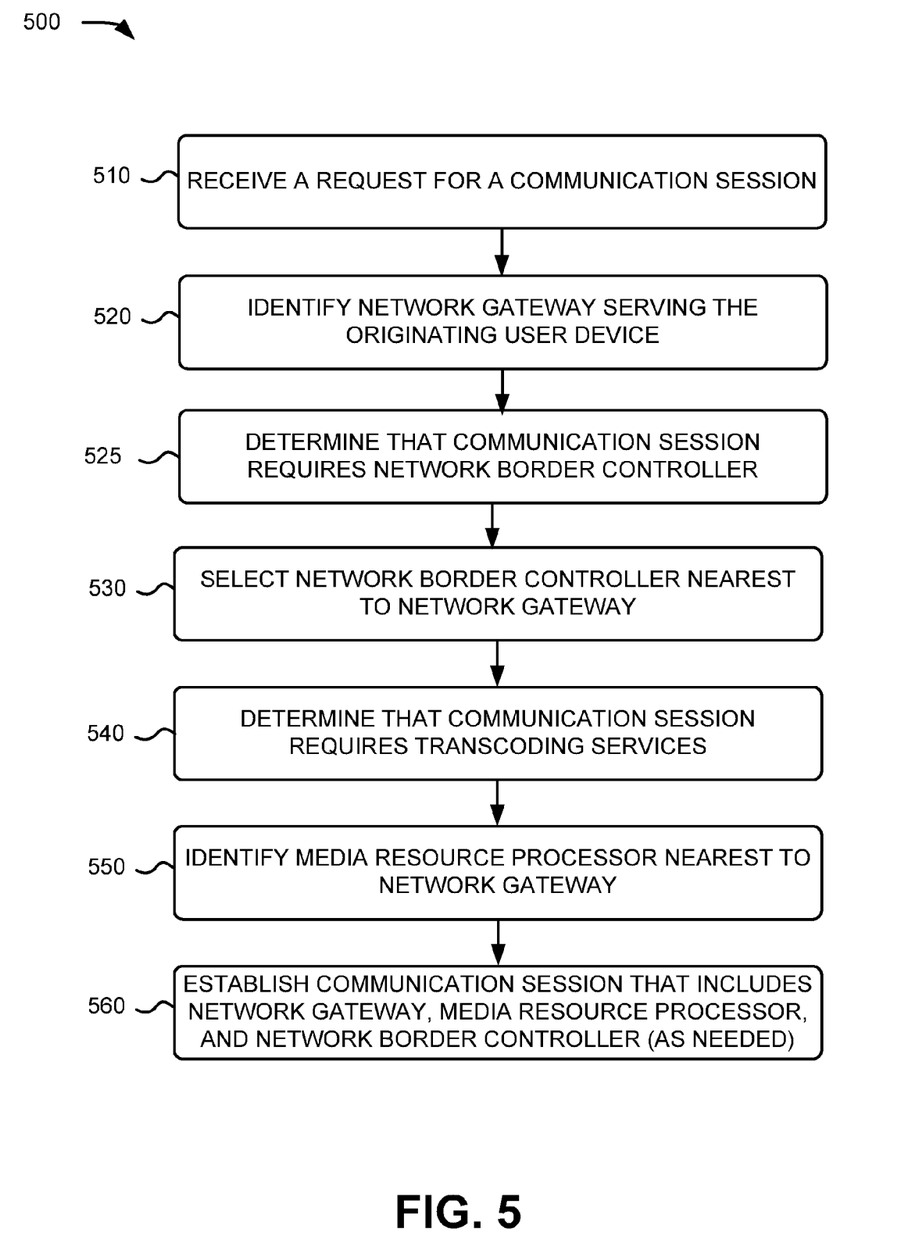
FIG. 5 is a diagram of an example process for establishing a communication session according to one or more implementations described herein.

FIG. 5 is a diagram of an example process 500 for establishing a communication session according to one or more implementations described herein. In some implementations, process 500 may be performed by one or more components of communication session controller 120. In some implementations, one or more blocks of process 500 may be performed by one or more other components, or a group of components, including or excluding communication session controller 120.

Process 500 may include receiving a request for a communication session (block 510). For example, communication session controller 120 may receive a communication session request from user device 250 via network gateway 130. In some implementations, the request may be a communication session request for a VoIP communication session. For instance, user device 250 may connect to eNodeB 240 and communicate a request for a VoIP communication session to network 110 and communication session controller 120 via network gateway 130 and/or P-CSCF 210.

A network gateway may be identified (block 520). For instance, communication session controller 120 may determine an ID of network gateway 130. In some implementations, the network gateway ID may have already been received and stored locally in response to a user device 250 registering with HSS 230. In certain implementations, communication session controller 120 may determine the network gateway ID based on an address (e.g., an IP address) assigned to an originator of the communication session request (e.g., user device 250).

A determination may be made that the communication session requires the support of a network border controller (block 525). For example, communication session controller may determine that network border inter-working and that functions are needed because the requested termination is located in a different network or uses a different technology.

A network border controller 140 nearest to network gateway 130 may be selected (block 530). For example, communication session controller 120 may identify which network border controller 140 is nearest to network gateway 130. In some implementations, communication session controller 120 may do so by, for example, accessing a data structure, such as a table, a database, or a map, that associates network gateways 130 and network border controllers 140 according to distance or other criteria. Depending on the implementation, the data structure may be stored locally at communication session controller 120 or remotely by another device or group of devices.

A determination may be made that the communication session requires transcoding services (block 540). For example, communication session controller 120 may determine whether transcoding services will be required for a particular communication session based on a communication session request. As mentioned above, transcoding services may be required when an originating network or device uses an encoder/decoder or an encoding/decoding system incompatible with an encoder/decoder or an encoding/decoding system used by a terminating network or device. For example, transcoding services may be required when an originating device that only supports an adaptive multi-rate (AMR) codec is calling a terminating device that supports a G.711 codec but not the AMR codec. As a result, for example, MRP 150 (e.g., a transcoder) may be used to transcode AMR packets to G.711 packets, or vise versa, so that the caller and the called user may talk to each other.

A media resource processor 150 nearest to network gateway 130 may be identified (block 550). For example, communication session controller 120 may identify which media resource processor 150 is nearest to network gateway 130. In some implementations, this may include performing one or more operations similar to those performed in selecting network border controller 140 (block 530), such as obtaining a network gateway ID of network gateway 130, accessing a data structure (e.g., a table, a database, or a map, etc.) that associates network gateways 130 with media resource processors 150, and using the network gateway ID and the data structure to identify which media resource processor 150 is nearest to network gateway 130. In such implementations, communication session controller 120 may notify MRC 235 of the identified media resource processor 150 via a SIP INVITE message.

However, as mentioned above, communication session controller 120 may also, or alternatively, identify indirectly which media resource processor 150 is nearest to network gateway 130 by sending the network gateway ID of network gateway 130 to MRC 235, and MRC 235 may identify which media resource processor 150 is nearest to network gateway 130. MRC 235 may do so by, for example, accessing a locally stored data structure that associates network gateways 130 with media resource processors 150 according to distance. In such implementations, communication session controller 120 may communicate the network gateway ID to MRC 235 using a SIP INVITE message and a private protocol extension so that media resource processor 150 is included in the data transport path of the communication session.

A communication session may be established (block 560). For example, communication session controller 120 may operate to establish, or enable the establishment of, a communication session corresponding to a communication session request received from network gateway 130. In implementations where transcoding services are not needed, the communication session may include a transport path that involves network gateway 130 and network border controller 140. By contrast, in implementations where transcoding services are needed, the data transport path of the communication session may include network gateway 130, MRP 150, and network border controller 140.

While FIG. 5 shows a flowchart diagram of an example process 500 for selecting the data transport path of a communication session, in other implementations, a process for selecting the data transport path of a communication session may include fewer operations, different operations, differently arranged operations, or additional operations than depicted in FIG. 5. The order of blocks may be different from implementation to implementation. For example, the determination of the need of a network border controller (block 525) and its selection (block 530) may be implemented before or after the determination of the need of a MRP 150 (block 540) and its selection (block 550). Similarly, block 520 and block 525 can be in a different order.

Figure 6:
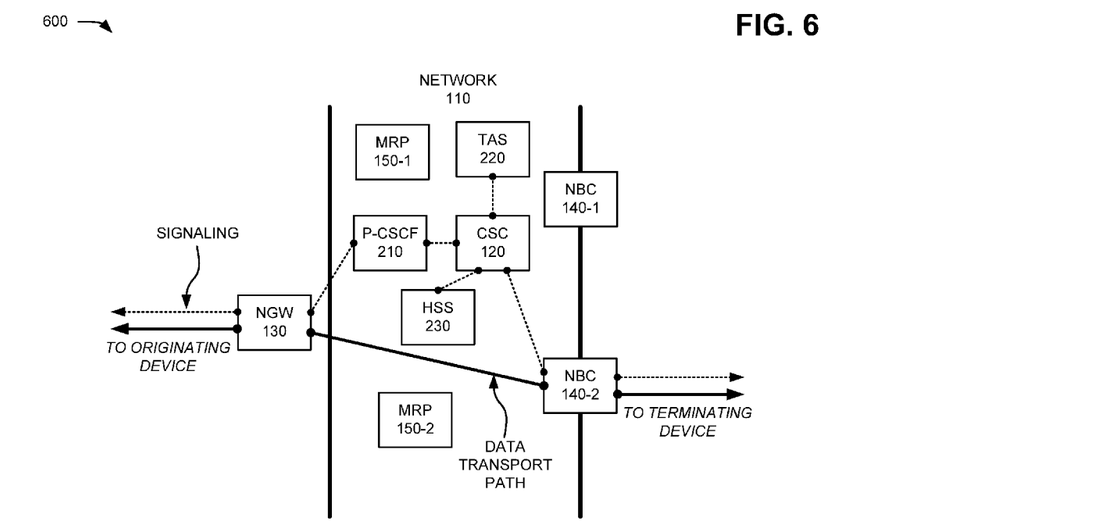
FIGS. 6-8 are diagrams of examples of communication sessions according to one or more implementations described herein.
Figure 7:
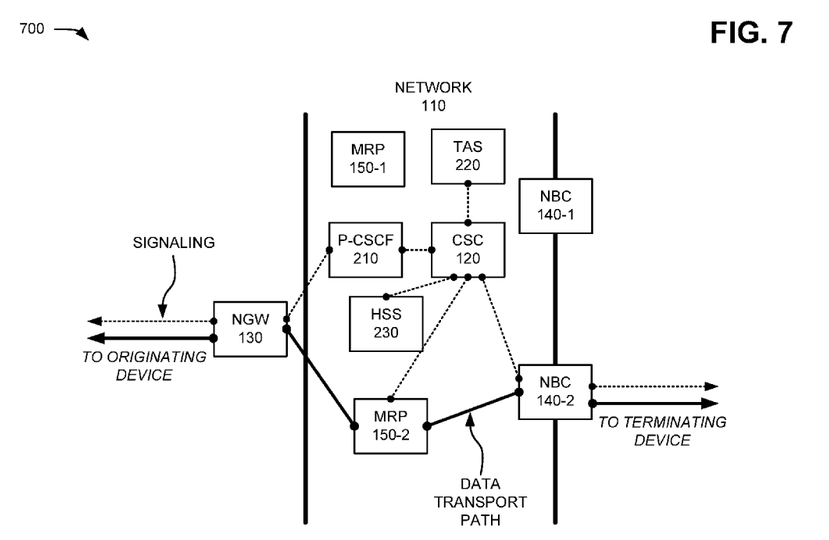
Figure 8:
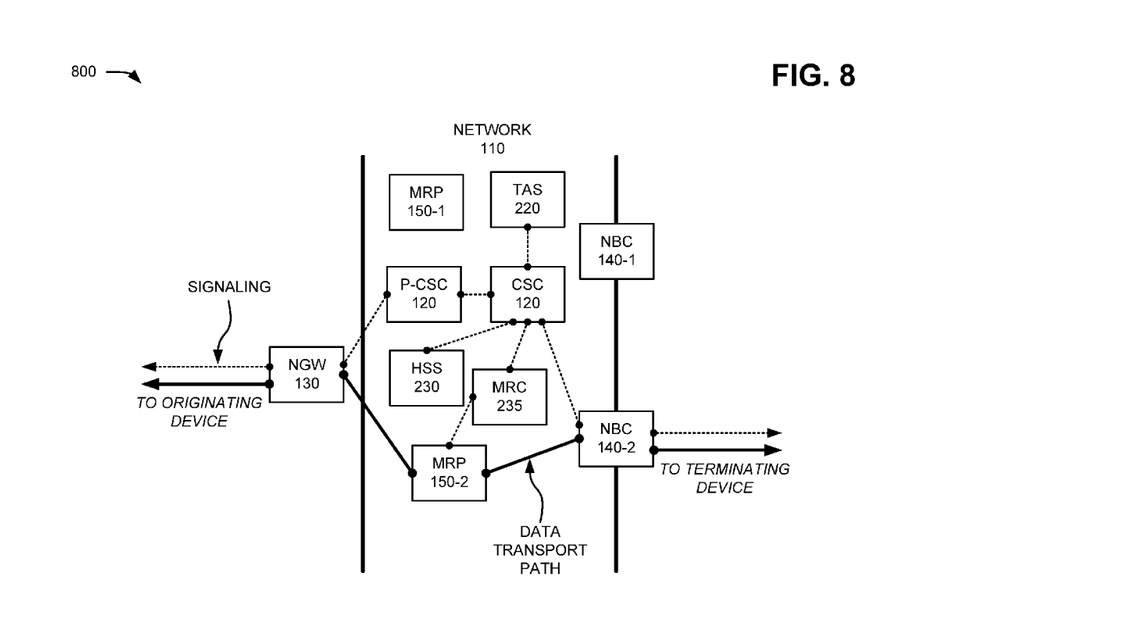

FIGS. 6-8 are diagrams of example communication sessions (referenced as 600, 700, and 800, respectively) according to one or more implementations described herein. As depicted, communication sessions (600, 700, and 800) may include signaling paths that involve many of the servers, controllers, nodes, or other devices of network 110. Signaling paths (represented by the dotted lines) may, for example, carry the signaling messages to allow the communication session between two ends is established and managed properly (e.g., by providing point-of-contact services via P-CSCF server 210, call waiting and other telephony services via TAS 220, authorization and other management services via HSS 230, etc). In some implementations, signaling messages may be implemented using SIP protocol.

As depicted, communication sessions (600, 700, and 800) may also include data transport paths that carry data packets from one end of a communication session to another end. In some implementations, the data transport path, also known as the bearer path or the media path, may be a route for transmitting voice data. In certain implementations, the data transport path may be established using SIP signaling and carry RTP packets.

Referring to FIG. 6, since the depicted data transport path flows directly from network gateway 130 to network border controller 140, communication session 600 may correspond to a scenario where transcoding services are not required. The signaling paths, depicted as dotted lines in FIG. 6, may represent call processing in communication session 600. For example, P-CSCF 210 may provide a point of contact for user device 250, TAS 220 may provide non-routing services, such as voicemail, call waiting, or other telephony services, and HSS 230 may provide the subscriber profile information, which may include the serving network gateway identification, to CSC 120 and TAS 220, and CSC 120 may establish the data transport path using the nearest network border controller 140-2 to network gateway 130. In some implementations, CSC 120 and/or P-CSCF 210 may communicate to network gateway 130 via a PCRF for the data transport path establishment.

By contrast, the data transport path of FIG. 7 includes network gateway 130, media resource processor 150, and network border controller 140. Similar to the communication session of FIG. 6, in FIG. 7, P-CSCF 210 may provide a point of contact for user device 250, TAS 220 may provide non-routing services, such as voicemail, call waiting, or other telephony services, HSS 230 may provide the subscriber profile information, which may include the serving network gateway identification, to CSC 120 and TAS 220, and CSC 120, may establish the data transport path using the nearest network border controller 140-2 to network gateway 130. In some implementations, CSC 120 or P-CSCF 219 may communicate to network gateway 130 via a PCRF (not shown) for the data transport path establishment. However, as mentioned above, the data transport path of FIG. 7 may include media resource processor 150-2, which may be consistent with a scenario where transcoding services are required for communication session 700. FIG. 7 depicts that MRC 235 is not shown and may be implemented as part of CSC120 or part of MRP 150. For example, if MRC235 is integrated with CSC 120, then CSC 120 may communicate with MRP 150 in H.248 protocol. If it is integrated with MRP150, then CSC120 may communicate with MRP150 in SIP or H.248 protocol.

Similarly, the data transport path of FIG. 8 includes network gateway 130, media resource processor 150, and network border controller 140. FIG. 8 also includes signaling paths to P-CSCF 210, which may provide a point of contact for a calling device (e.g., user device 250), signaling paths to TAS 220, which may provide communication session 700 with non-routing services, such as voicemail, call waiting, or other telephony services, and signaling paths to HSS 230. HSS 230 may provide subscriber profile information, which may include providing a serving network gateway identifier to CSC 120 and TAS 220, and CSC 120 may establish the data transport path using the nearest network border controller 140-2 to network gateway 130. In some implementations, CSC 120 or P-CSCF 210 may communicate to network gateway 130 via a PCRF for the data transport path establishment. The signaling paths of FIG. 8 may also, or alternatively, include communications between communication session controller 120 and MRC 235. As such, communication session 800 may represent a scenario where media resource processor 150 was identified and/or selected by MRC 235 (see, for example, the explanation above with respect to block 550 of FIG. 5). CSC 120 may communicate with MRC 235 using SIP signaling, and MRC 235 may communicate with MRP 150 using H.248 protocol.

In one or more implementations, described herein, devices may be used to establish communication sessions with efficient data transport paths. For example, communication session controller 120 may receive a request for a communication session from a user device 250 via a network gateway 130. The request may be directed to another user device 250, a network device/application, or another device located in another network. Communication session controller 120 may identify a network border controller 140 and (if needed) a media resource processor 150 that are located closest to network gateway 130. Communication session controller 120 may establish the requested communication session with a data transport path that includes network gateway 130, network border controller 140, and (if needed) media resource processor 150.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain implementations may involve a "component" that performs one or more functions. These components may include hardware, such as an ASIC or a FPGA, or a combination of hardware and software.

Even though particular combinations of features are recited in the claims and/or disclosed in the specification, these combinations are not intended to limit disclosure of the possible implementations. In fact, many of these features may be combined in ways not specifically recited in the claims and/or disclosed in the specification. Although each dependent claim listed below may directly depend on only one other claim, implementations disclosed herein include each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
    receiving, by a communication session controller, a request for a communication session from a network gateway;
    determining, by the communication session controller, that the communication session is intended for a device in an external network;
    identifying, by the communication session controller, a network border controller of a plurality of network border controllers, where a location of the network border controller is nearest to the network gateway of locations of other ones of the plurality of network border controllers, wherein identifying the network border controller comprises:
        obtaining a network gateway identifier (ID) associated with the network gateway,
        accessing a data structure that associates network gateway IDs with network border controllers according to distance, and
        using the network gateway ID of the network gateway and the data structure to identify the network border controller nearest to the network gateway; and
    establishing a data transport path for the communication session that includes the network gateway and the network border controller nearest to the network gateway.

2. The method of claim 1, where obtaining the network gateway ID comprises:
    receiving the network gateway ID from a home subscriber server (HSS), in response to a user device, corresponding to the request for the communication session, registering with the HSS.

3. The method of claim 1, where obtaining the network gateway ID comprises:
    identifying an Internet Protocol (IP) address of a source device of the request for the communication session, and
    determining the network gateway based on the IP address of the source device.

4. A method, comprising:
    receiving, by a communication session controller, a request for a communication session from a network gateway;
    determining, by the communication session controller, that the communication session is intended for a device in an external network;
    identifying, by the communication session controller, a network border controller of a plurality of network border controller, where a location of the network border controller is nearest to the network gateway of locations of other ones of the plurality of network border controllers;
    determining that the communication session will require encoding services;
    identifying a media resource processor of a plurality of media resource processors, where a location of the media resource controller is nearest to the network gateway of locations of other ones of the plurality of media resource processors;

establishing a data transport path for the communication session that includes the network gateway and the network border controller nearest to the network gateway; and including the media resource processor in the data transport path of the communication session.

5. The method of claim 4, where determining that the communication session will require encoding services comprises:

identifying a voice encoder used by an originating device of the communication session, identifying a voice encoder used by a terminating device of the communication session, and determining that the voice encoder of the originating device is incompatible with the voice encoder of the terminating user device.

6. The method of claim 4, where identifying the media resource processor comprises:

obtaining a network gateway identifier (ID) associated with the network gateway, accessing a data structure that associates network gateway IDs with media resource processors according to distance, and using the network gateway ID and the data structure to identify the media resource processor nearest to the network gateway.

7. The method of claim 6, where obtaining the network gateway ID comprises:

receiving the network gateway ID from a home subscriber server (HSS), in response to a user device, corresponding to the request for the communication session, registering with the HSS.

8. The method of claim 6, where obtaining the network gateway ID comprises:

identifying an address of a source device of the request for the communication session, and determining the network gateway ID based on the address of the source device.

9. The method of claim 4, where identifying the media resource processor comprises:

obtaining a network gateway identifier (ID) associated with the network gateway, sending the network gateway ID to a media resource controller, and receiving, from the media resource controller, identification of the media resource processor nearest to the network gateway.

10. The method of claim 1, wherein:

the request for the communication session originated from a user device connected to an access network of the network gateway, the request for the communication session is directed to a user device of the external network, the communication session comprises a Voice-over IP (VoIP) communication session, and the transport path of the communication session comprises a real-time transport protocol (RIP) bearer path.

11. A network controller, comprising:

a memory to store instructions; and a processor, connected to the memory, to:

receive a communication session request from a network gateway, the communication session request comprising a request to establish a communication session between two or more devices that communicate using different communication technologies, determine that the communication session requires support from a network border controller based on the two or more devices using different communication technologies an external network, access a data structure that associates network gateways with network border controllers according to distance, use the data structure to identify a network border controller that is located nearest to the network gateway, and establish a communication session comprising a data transport path between the network gateway and the network border controller, of a plurality of network border controllers, nearest to the network gateway.

12. The network controller of claim 11, where, to use the data structure to identify the network border controller, of the plurality of network border controllers, nearest to the network gateway, the processor is to:

obtain a network gateway identifier (ID) associated with the network gateway, and identify, in the data structure, the network border controller associated with the network gateway ID.

13. The network controller of claim 12, where the processor is to obtain the network gateway ID from a home subscriber server (HSS), in response to one of the two or more devices registering with the HSS.

14. The network controller of claim 12, where, to obtain the network gateway ID, the processor is to:

identify an address of the network gateway, and determine the network gateway ID based on the address of the network gateway.

15. The network controller of claim 11, where the processor is to:

determine that the communication session requires encoding services, identify a media resource processor, of a plurality of media resource processors, that is located nearest to the network gateway, and include the media resource processor in the data transport path.

16. The network controller of claim 15, where, to determine that the communication session requires encoding services, the processor is to:

identify a voice encoder used by an originating device of the two or more devices, identify a voice encoder used by a terminating device of the two or more devices, and determine that the voice encoder of the originating device is incompatible with the voice encoder of the terminating device.

17. The network controller of claim 15, where, to identify the media resource processor that is located nearest to the network gateway, the processor is to:

obtain a network gateway identifier (ID) associated with the network gateway, access a data structure that associates network gateway IDs with media resource processors according to distance, and use the network gateway ID and the data structure to identify the media resource processor that is located nearest to the network gateway.

18. The network controller of claim 17, where, to include the media resource processor in the data transport path, the processor is to:

send the network gateway ID to the media resource controller using a session invite message.

19. The network controller of claim 11, where:
the request for the communication session originated from a first user device, of the two or more devices, connected to an access network corresponding to the network gateway,
the request for the communication session is directed to a second user device, of the two or more devices, connected to the external network,
the communication session comprises a Voice-over IP (VoIP) communication session, and
the data transport path of the communication session comprises a real-time transport protocol (RTP) bearer path.

20. A non-transitory computer-readable medium storing a program for causing a device to perform a method, the method comprising:
receiving a communication session request from a network gateway, the communication session request comprising a request to establish a communication session between an originating device and a terminating device;
determining that the communication session request is directed the terminating device on an external network;
identifying a network border controller, of a plurality of network border controllers, that is located nearest to the network gateway and capable of communicating with the external network;
determining that the communication session requires encoding services;
identifying a media resource processor, of a plurality of media resource processors, that is located nearest to the network gateway and capable of providing encoding services, the media resource processor being located between the network gateway and the network border controller; and
establishing a communication session comprising a data transport path that includes the network gateway, the media resource processor, and the network border controller.

21. The computer-readable medium of claim 20, where the media resource processor and the network border controller are identified based on a network gateway identifier (ID) of the network gateway.

22. The computer-readable medium of claim 21, the method further comprising:
receiving the network gateway ID from a home subscriber server (HSS) in response to the originating device or terminating device registering with the HSS.

23. The computer-readable medium of claim 21, the method further comprising:
identifying an address of the network gateway, and
determining the network gateway ID based on the address of the network gateway.

* * * * *